United States Patent
Kato

(10) Patent No.: US 10,061,152 B2
(45) Date of Patent: Aug. 28, 2018

(54) DISPLAY DEVICE

(71) Applicant: Japan Display Inc., Minato-ku (JP)

(72) Inventor: Katsuhiro Kato, Tokyo (JP)

(73) Assignee: Japan Display Inc., Minato-ku (JP)

( * ) Notice: Subject to any disclaimer, the term of this patent is extended or adjusted under 35 U.S.C. 154(b) by 173 days.

(21) Appl. No.: 15/262,532

(22) Filed: Sep. 12, 2016

(65) Prior Publication Data

US 2017/0075165 A1 Mar. 16, 2017

(30) Foreign Application Priority Data

Sep. 14, 2015 (JP) .................................. 2015-180582

(51) Int. Cl.
| | | |
|---|---|---|
| *G02F 1/1335* | (2006.01) | |
| *G02F 1/1343* | (2006.01) | |
| *G02F 1/1333* | (2006.01) | |
| *G02F 1/1362* | (2006.01) | |

(52) U.S. Cl.
CPC .. *G02F 1/133512* (2013.01); *G02F 1/134309* (2013.01); *G02F 1/136286* (2013.01); *G02F 2001/133302* (2013.01); *G02F 2201/123* (2013.01); *G02F 2202/28* (2013.01)

(58) Field of Classification Search
CPC ......... G02F 1/133512; G02F 1/134309; G02F 1/13338; G06F 3/044; G06F 3/0412; G06F 3/0416; G06F 2203/04103; G06F 2203/04104; G06F 2203/04105; G06F 2203/04106; G06F 2203/04107; G06F 2203/04111; H04N 21/42224

USPC ............................................................ 349/12
See application file for complete search history.

(56) References Cited

U.S. PATENT DOCUMENTS

| | | | | |
|---|---|---|---|---|
| 2010/0164881 | A1* | 7/2010 | Kuo ....................... | G06F 3/044 |
| | | | | 345/173 |
| 2014/0178618 | A1 | 6/2014 | Tanabe et al. | |
| 2016/0054607 | A1* | 2/2016 | Ishizaki ............... | G02F 1/13338 |
| | | | | 349/12 |
| 2017/0146867 | A1* | 5/2017 | Wang ................. | G02F 1/134309 |

FOREIGN PATENT DOCUMENTS

JP 2014-122947 7/2014

* cited by examiner

*Primary Examiner* — Hoan C Nguyen
(74) *Attorney, Agent, or Firm* — Oblon, McClelland, Maier & Neustadt, L.L.P.

(57) ABSTRACT

According to one embodiment, a display device includes a display module including a peripheral area located outside a display area, a cover member including a phototransmissive region and a light-shielding region, and a ultraviolet-cured resin layer which bonds the display module to the cover member, includes first and second portions, and contains polar monomers as a monomer component. A transparent first electrode is interposed between the cover member and the display module to cover the phototransmissive region. A second electrode is separated from the first electrode and extends along the first electrode in an area corresponding to the peripheral area. The first and second electrodes apply an electric field to the part of the first portion to orient the polar monomers.

18 Claims, 6 Drawing Sheets

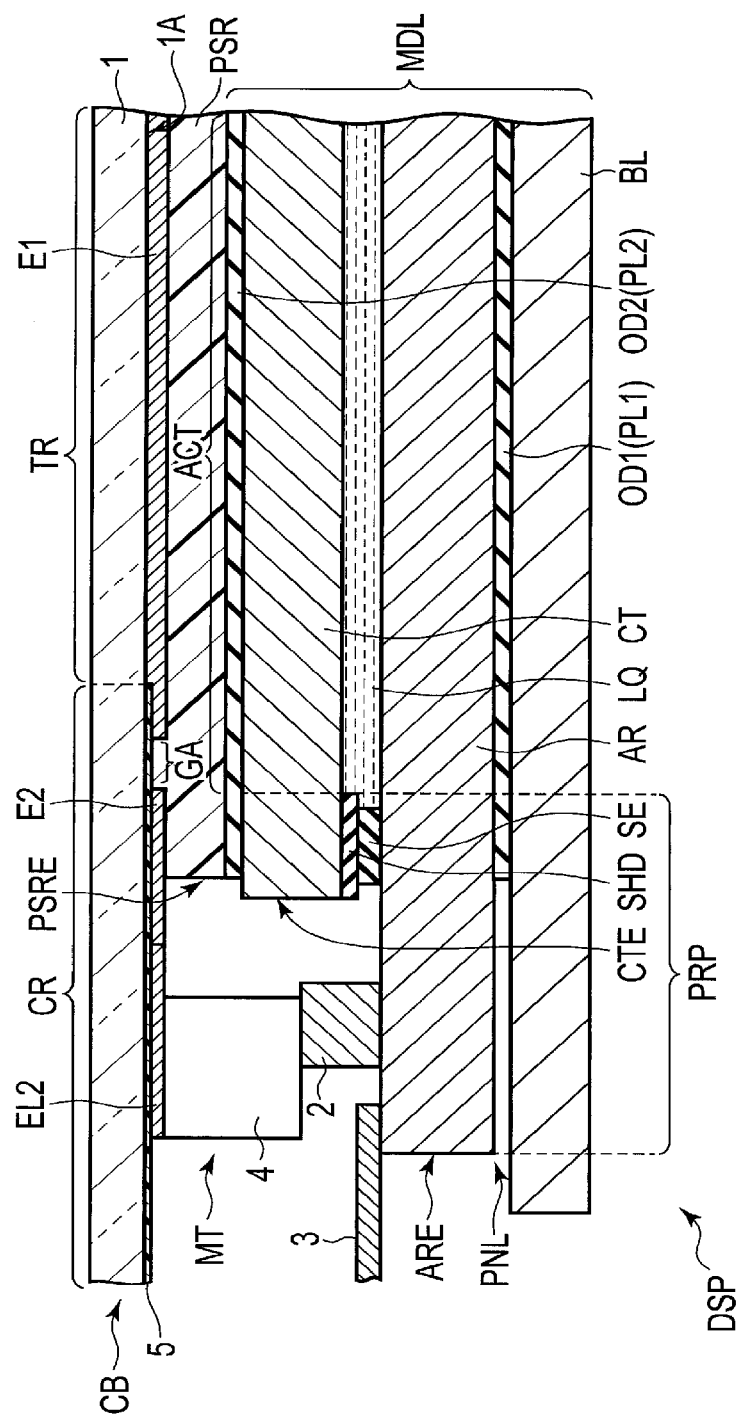
F I G. 1

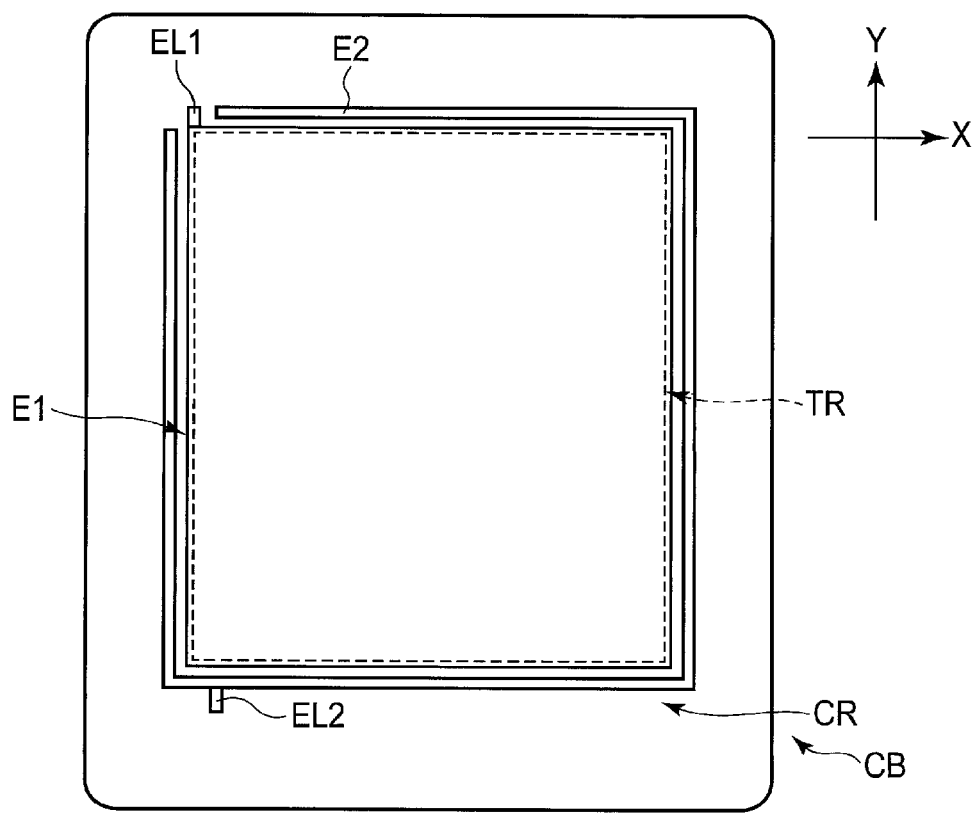
F I G. 3

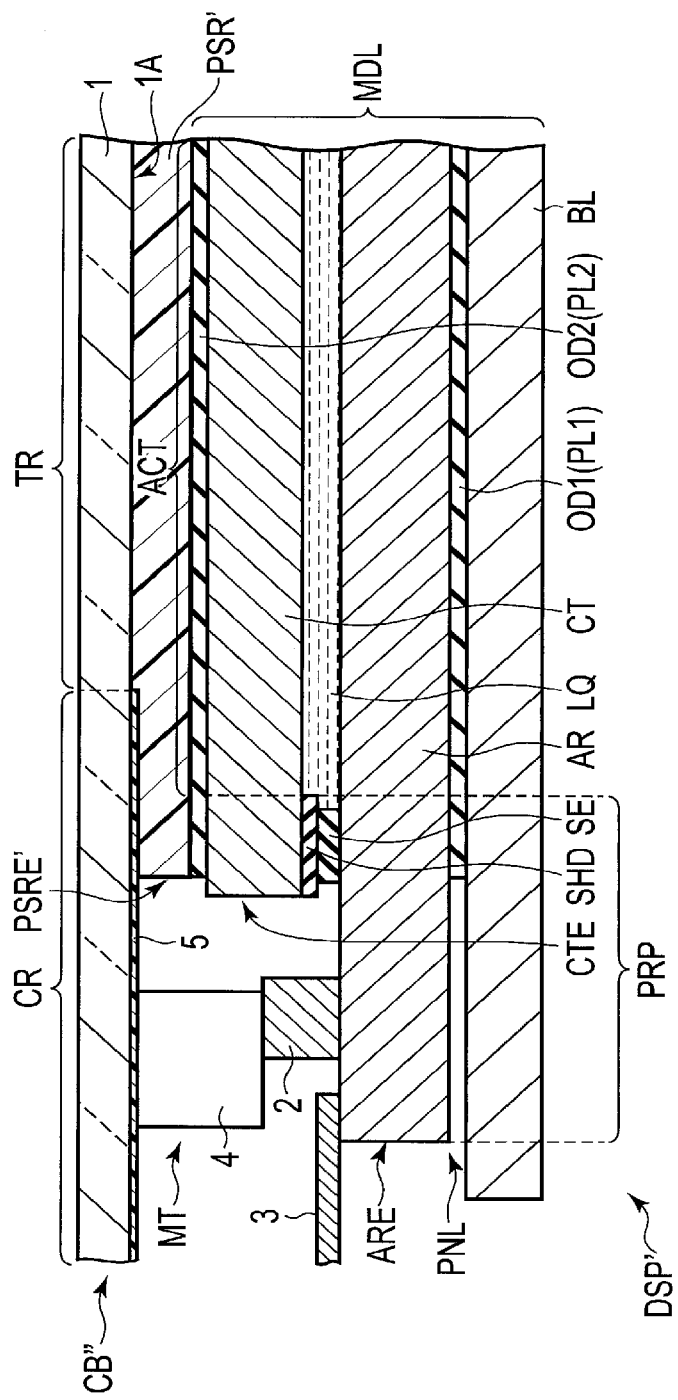
F I G. 5

DISPLAY DEVICE

CROSS-REFERENCE TO RELATED APPLICATIONS

This application is based upon and claims the benefit of priority from Japanese Patent Application No. 2015-180582, filed Sep. 14, 2015, the entire contents of which are incorporated herein by reference.

FIELD

Embodiments described herein relate generally to a display device.

BACKGROUND

Recently, in terms of eco-friendliness such as space saving or electric power saving, types of products which utilize liquid crystal panels or organic electroluminescent (EL) panels as display devices have been increasing, representatively including liquid crystal monitors, liquid crystal televisions, feature phones, smartphones, tablet computers, electronic books and notebook computers. In particular, electronic devices such as smartphones, tablet computers, electronic books and feature phones comprise a display panel such as a liquid crystal panel or an organic EL panel, and a cover member which covers the outer peripheral portion of the screen excluding the display portion.

A technique for bonding the display panel with the cover member exists, which comprises applying an ultraviolet-curable resin to the surface of one of them, and overlapping the other one with that one. After the resin spreads to the necessary filling area, the resin is irradiated with ultraviolet light and cured.

In consideration of variation in the amount of resin applied, or prevention of bubbles, it is difficult to restrict the filling area of resin to only the display area which displays an image. Thus, the filling area of resin may spread to the outside of the display area and range to the outer peripheral portion of the cover member covered by a colored layer, etc., which is hard to transmit light. In this case, the ultraviolet light necessary for curing is difficult to reach the portion located under the colored layer out of the filling area of resin. The colored layer widely covers the vicinity of the mounting portion of the display panel, for example, on which a driving IC chip is mounted. Therefore, the ultraviolet light may hardly reach the vicinity of the mounting portion, and the resin may not be sufficiently cured. If the resin is uncured, the spreading of resin cannot be prevented, and the spreading resin goes into a gap in the display portion, resulting in a display defect, leading to deterioration in quality. If the resin spreads to the outside of the display panel in an uncured state, the spreading resin needs to be removed, leading to increase of the number of process steps for manufacturing the display device.

BRIEF DESCRIPTION OF THE DRAWINGS

FIG. 1 is an enlarged cross-sectional view schematically illustrating a display device according to a first embodiment.

FIG. 3 is a bottom view schematically illustrating a cover member provided in the display device according to the first embodiment.

FIG. 5 is an enlarged cross-sectional view schematically illustrating a display device according to a third embodiment.

DETAILED DESCRIPTION

Figure 2:
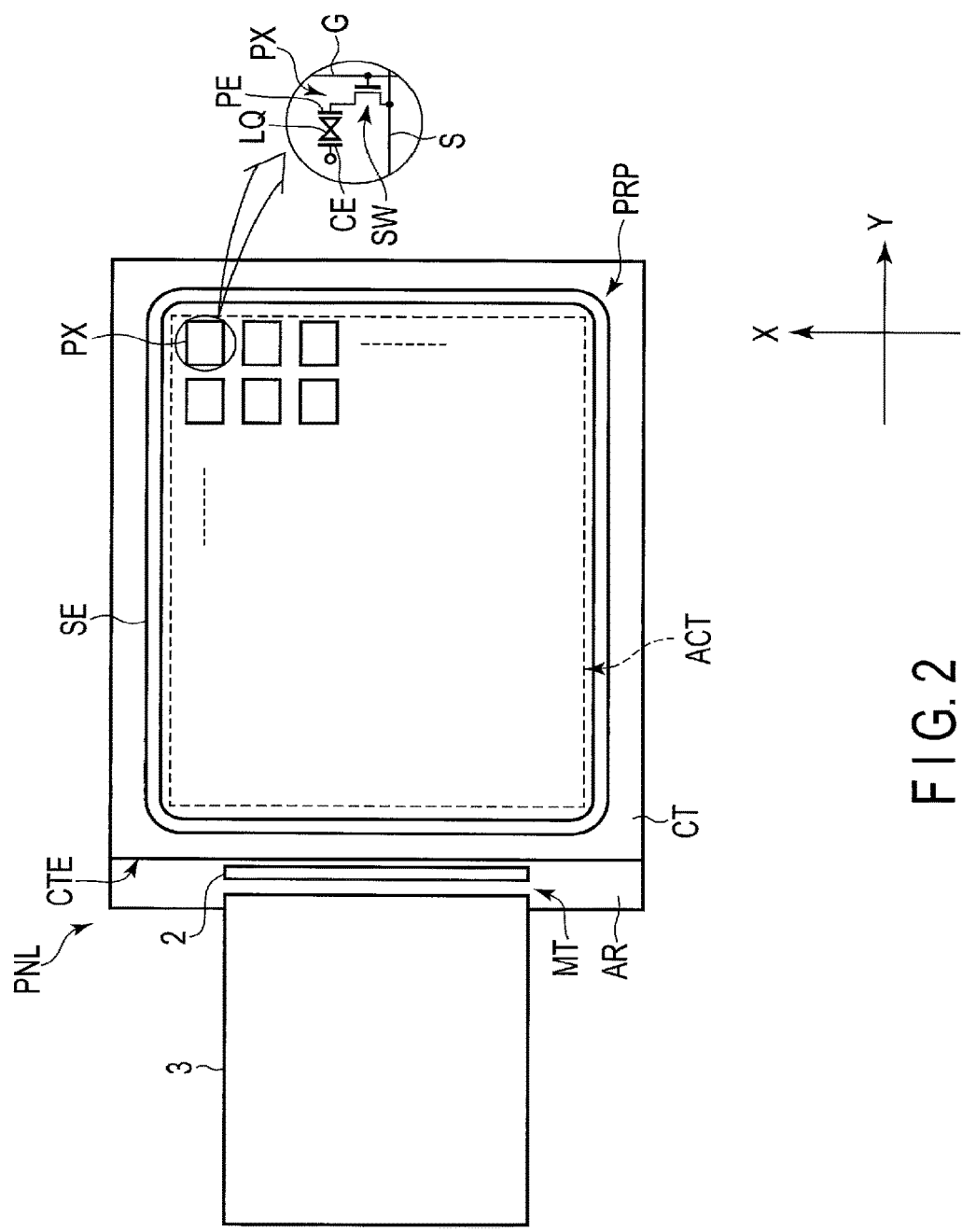
FIG. 2 is a plan view schematically illustrating a display panel provided in the display device according to the first embodiment.

According to a first aspect, there is provided a display device comprising: a display module comprising a display area which displays an image, a peripheral area which has a frame shape and is located outside the display area, and a mounting portion which is provided in the peripheral area and mounts a signal supply source thereon; a cover member comprising a phototransmissive region facing the display area, and a light-shielding region facing the peripheral area; and an ultraviolet-cured resin layer which bonds the display module to the cover member, includes a first portion in contact with a frame portion adjacent to the display area of the light-shielding region and a second portion in contact with the phototransmissive region, and contains polar monomers as a monomer component. A transparent first electrode is interposed between the cover member and the display module, and is provided so as to cover an entire part of the phototransmissive region. A second electrode is interposed between the cover member and the display module, and is provided so as to be separated from the first electrode and extend along the first electrode in an area corresponding to the peripheral area in which the mounting portion of the display module is provided. The second electrode is provided such that a part of the first portion goes into a gap between the first electrode and the second electrode. The first and second electrodes apply an electric field to the part of the first portion to orient the polar monomers.

According to a second aspect, there is provided a display device comprising: a display panel comprising a display area which displays an image, and a peripheral area which has a frame shape and is located outside the display area; a cover member comprising a phototransmissive region facing the display area, and a light-shielding region facing the peripheral area; an ultraviolet-cured resin layer which bonds the display panel with the cover member and contains polar monomers as a monomer component; a transparent first electrode which is provided between the cover member and the display panel so as to cover an entire part of the phototransmissive region; and a second electrode provided between the cover member and the display panel. The second electrode is separated from the first electrode and extends along the first electrode in the peripheral area of the display panel. The ultraviolet-cured resin layer is provided in a gap between the first electrode and the second electrode. The polar monomers are oriented in a direction of an electric field formed between the first electrode and the second electrode.

Embodiments will be described in detail hereinafter with reference to the accompanying drawings. Structural elements which function in the same or a similar manner are denoted by like reference numbers throughout the drawings, detailed description thereof being omitted.

FIG. 1 is an enlarged cross-sectional view schematically illustrating a display device DSP according to a first embodiment.

The display device DSP comprises a display module MDL which displays an image in a display area ACT, a cover member CB which faces the display module MDL, first and second electrodes E1 and E2 provided on the cover member CB, and an ultraviolet(UV)-cured resin layer PSR which bonds the display module MDL with the cover member CB. In the example illustrated in the Figure, the display module MDL comprises a display panel PNL and a backlight BL. The display panel PNL and the cover member CB may be integrated by, for example, a double-sided tape 4.

The backlight BL is provided on the rear side of the display panel PNL. Various forms can be applied to the backlight BL. Any light source including a light-emitting diode (LED) or a cold-cathode fluorescent lamp (CCFL) can be adopted for the backlight BL. The explanation of the detailed structure is omitted.

In the embodiment, the display panel PNL is a liquid crystal panel; however, the display panel PNL may be a different display panel such as an organic electroluminescent panel.

The display panel (liquid crystal panel) PNL illustrated in FIG. 1 is, for example, an active-matrix liquid crystal panel, and comprises an array substrate AR and a counter-substrate CT. The array substrate AR and the counter-substrate CT are bonded together by a sealing material SE with a predetermined cell gap being formed between the substrates. The cell gap is formed by a plurality of columnar spacers (not illustrated) provided between the array substrate AR and the counter-substrate CT. A liquid crystal LQ is retained in the area surrounded by the sealing material SE in the cell gap.

Regarding the array substrate AR, the detailed explanation of the structure on the inner surface facing the counter-substrate CT is omitted. A first optical element OD1 comprising a first polarizer PL1 is attached to the outer surface of the array substrate AR facing the backlight BL. The first optical element OD1 is provided over at least the entire display area ACT. In the example illustrated in the Figure, the first optical element OD1 further extends to a peripheral area PRP.

Regarding the counter-substrate CT, the detailed explanation of the structure on the inner surface facing the array substrate AR is omitted, except that a peripheral light-shielding layer SHD is provided on the inner surface of the counter-substrate CT. The peripheral light-shielding layer SHD is provided around the display area ACT and has the shape of a rectangular frame surrounding the display area ACT although further detailed explanation is omitted here. Thus, the peripheral light-shielding layer SHD is provided in the peripheral area PRP of the display panel PNL. A second optical element OD2 comprising a second polarizer PL2 is attached to the outer surface of the counter-substrate CT facing the cover member CB. The second optical element OD2 is provided over the entire display area ACT. The second optical element OD2 further extends to the peripheral area PRP. An end portion of the second optical element OD2 is provided at a position overlapping the peripheral light-shielding layer SHD.

In the display panel PNL having the above structure, the peripheral area PRP includes the area in which the peripheral light-shielding layer SHD is provided. The peripheral area PRP further includes an area outside the peripheral light-shielding layer SHD. The peripheral area PRP includes a mounting portion MT provided on the external side beyond a substrate end portion CTE of the counter-substrate CT. A driving IC chip 2 and a flexible printed circuit (FPC) board 3 as signal supply sources are mounted in the mounting portion MT of the array substrate AR. The driving IC chip 2 is mounted in the mounting portion MT so as to be located on a side close to the display area ACT, in other words, so as to be located at a position close to the substrate end portion CTE. The FPC substrate 3 is mounted in the mounting portion MT so as to be located outside the driving IC chip 2, in other words, so as to be located at a position close to a substrate end portion ARE of the array substrate AR.

FIG. 2 is a plan view schematically illustrating the display panel PNL of the display device DSP of FIG. 1. As is apparent from FIG. 2, the display area ACT corresponds to the area surrounded by the sealing material SE. The display area ACT is, for example, substantially rectangular, and comprises m×n pixels PX arrayed in a matrix, where m and n are positive integers.

The array substrate AR comprises a gate line G extending in a first direction X, a source line S extending in a second direction Y perpendicular to the first direction X, a switching element SW connected to the gate line G and the source line S, a pixel electrode PE connected to the switching element SW, etc. A counter-electrode CE facing the pixel electrode PE of each pixel via the liquid crystal layer LQ is provided on, for example, the counter-substrate CT.

Although the explanation of the detailed structure of the liquid crystal panel is omitted, the liquid crystal panel is structured such that a mode mainly using a vertical electric field, such as a twisted nematic (TN) mode, an optically compensated bend (OCB) mode or a vertical alignment (VA) mode, or a mode mainly using a lateral electric field, such as an in-plane switching (IPS) mode or a fringe field switching (FFS) mode, may be applied. When a mode using a lateral electric field is applied, both the pixel electrode PE and the counter-electrode CE are provided on the array substrate AR.

The signal supply sources which supply signals necessary to drive the display panel PNL, such as the driving IC chip 2 and the FPC board 3, are located in the peripheral area PRP provided outside the display area ACT as described above. The driving IC chip 2 and the FPC board 3 are mounted in the mounting portion MT of the array substrate AR extending outside beyond the substrate end portion CTE of the counter-substrate CT. The peripheral area PRP is the area surrounding the display area ACT and includes the area in which the sealing material SE is provided. The peripheral area PRP has the shape of a rectangular frame.

In addition to the function of displaying an image in the display area ACT, the display panel PNL may comprise a built-in touch sensor which detects a contact of an object on the detection surface (for example, the top surface of the cover member CB as described later). The touch sensor may be provided on the detection surface of the counter-substrate CT of the display panel PNL. Although the detailed explanation of the touch sensor is omitted here, for example, a capacitive type for detecting the change in electrostatic capacitance of sensing lines can be applied.

Returning to FIG. 1, the cover member CB comprises a transparent substrate 1, and has a phototransmissive region TR and a light-shielding region CR. The transparent substrate 1 is, for example, a transparent glass substrate or plastic plate. The thickness of the transparent substrate 1 is not particularly limited. The transparent substrate 1 may be a film which is comparatively thin, or may be a flat plate which is comparatively thick. The phototransmissive region TR faces the display area ACT of the display panel PNL.

The light-shielding region CR is located outside the phototransmissive region TR. The light-shielding region CR faces the peripheral area PRP of the display module MDL and an end portion of the display area ACT. As a matter of course, the light-shielding region CR also faces the signal supply sources (the driving IC chip 2 and the FPC substrate 3). The light-shielding region CR is adjacent to the phototransmissive region TR, and also faces an end portion of the second optical element OD2 located in the peripheral area PRP of the display panel PNL, the substrate end portion CTE of the counter-substrate CT, and the substrate end portion ARE of the array substrate AR. The light-shielding region CR is also located above the peripheral light-shielding layer SHD. The light-shielding region CR is formed by providing a colored layer 5 on the rear surface of the transparent substrate 1. The colored layer 5 is provided in substantially the entire light-shielding region CR on an inner surface 1A of the substrate 1 (or on a side facing the display module MDL). Needless to say, the colored layer 5 is not provided in the phototransmissive region TR.

The color of the colored layer 5 may be black, or may be selected from various other colors. The light-shielding region CR is formed by providing the colored layer 5 so as to prevent visual confirmation of the peripheral area PRP of the display module MDL when observed from the front side of the cover member CB (or so as to prevent light from entering the peripheral area PRP of the display module MDL from the front side of the cover member CB).

FIG. 3 is a bottom view schematically illustrating the cover member CB of the display device DSP of FIG. 1.

As illustrated in FIG. 3, the cover member CB is, for example, substantially rectangular, having short sides in the first direction X and long sides in the second direction Y. The phototransmissive region TR is located substantially in the central portion of the cover member CB and has a shape corresponding to that of the display area ACT. In the example illustrated in the Figure, the phototransmissive region TR is rectangular. As described above, the light-shielding region CR is located in the peripheral portion of the cover member CB and has a frame shape surrounding the phototransmissive region TR. In the example illustrated in the Figure, the light-shielding region CR has a frame shape continuously formed around the phototransmissive region TR, and extends to each side of the cover member CB.

With reference to FIG. 1 and FIG. 3, the first electrode E1 is provided on a side of the substrate 1 of the cover member CB facing the display module MDL. The first electrode E1 is provided so as to cover the entire phototransmissive region TR of the cover member CB. In the example illustrated in the Figures, the first electrode E1 is located substantially in the central portion of the cover member CB, corresponding to the position of the phototransmissive region TR. Further, the first electrode E1 is rectangular, corresponding to the shape of the phototransmissive region TR. In the example illustrated in the Figures, the peripheral portion of the first electrode E1 extends into the light-shielding region CR. The first electrode E1 has the shape of a thin film and is formed of a transparent electrically conductive material such as indium tin oxide (ITO) or fluorine-doped tin oxide (FTC)).

The second electrode E2 is provided, through the colored layers, in the light-shielding region CR on a side of the substrate 1 of the cover member CB facing the display module MDL. The second electrode E2 is provided so as to be separated from the first electrode E1 by a gap GA (for example, the distance of the gap GA between the first electrode E1 and the second electrode E2 is 0.1 mm) and extend along the first electrode E1 in at least an area of the light-shielding region CR corresponding to the peripheral area PRP in which the mounting portion MT of the display module MDL is provided. In the example illustrated in the Figures, the second electrode E2 is separated from the first electrode E1 and has the shape of a rectangular frame surrounding the rectangular first electrode E1. The second electrode E2 has the shape of a thin film and is formed of a transparent electrically conductive material such as indium tin oxide (ITO) or fluorine-doped tin oxide (FTO).

The first electrode E1 and the second electrode E2 have a first lead portion EL1 and a second lead portion EL2, respectively, for connection to an external power source connected to the peripheral portion of the cover member CB. The material of the first lead portion EL1 and the second lead portion EL2 are not particularly limited as long as it is formed of a conductive material. For example, the first lead portion EL1 and the second lead portion EL2 are formed of a transparent conductive material having a band shape extending from the periphery of the first electrode E1 and the second electrode E2, respectively. When the first lead portion EL1 and the second lead portion EL2 are connected to an external power source, voltage can be applied to the first electrode E1 and the second electrode E2 via the first lead portion EL1 and the second lead portion EL2.

The first electrode E1 and the second electrode E2 are attached to the display module MDL side of the cover member CB with an adhesive. The adhesive is, for example, an ultraviolet-curable resin, which is cured when irradiated with ultraviolet (UV) light from the transparent first and second electrode E1 and E2 side in a state where the resin is interposed between the cover member CB and the first or second electrode E1 or E2, bonding the cover member CB with the first and second electrodes E1 and E2.

As illustrated in FIG. 1, a UV-cured resin layer PSR is interposed between the top surface of the display module MDL and the rear surface of the cover member CB. In the example illustrated in the Figure, the UV-cured resin layer PSR is in contact with the surface of the second optical element OD2 on the display module MDL side and covers the display area ACT of the display module MDL. The UV-cured resin layer PSR is in contact with the surfaces of the first electrode E1, the second electrode E2 and the colored layer 5 on the cover member CB side and partially goes into the gap GA between the first electrode E1 and the second electrode E2. The UV-cured resin layer PSR covers the phototransmissive region TR of the cover member CB. The UV-cured resin layer PSR includes a first portion and a second portion. The first portion has a frame shape and is in contact with the frame portion of the light-shielding region CR adjacent to the display area ACT. The second portion is in contact with the phototransmissive region TR. The first portion of the UV-cured resin layer PSR is located immediately under the light-shielding region CR. Thus, the ultraviolet light necessary for curing is hard to reach the first portion.

The UV-cured resin layer PSR is formed by curing a UV-curable resin. The UV-curable resin is a resin material which is cured by irradiation with ultraviolet light (for example, light having a wavelength less than or equal to 380 nm). The UV-cured resin layer PSR contains polar monomers having permanent dipoles as a monomer component. The polar monomers have functional groups such as a hydroxyl group, an amino group, a carboxy group and an amide group. The UV-cured resin layer PSR may be formed of an acrylic resin which is transparent UV-curable resin, such as 2-ethylhexyl acrylate.

The first electrode E1 and the second electrode E2 are provided such that the first portion of the UV-cured resin layer PSR shaded by the light-shielding region CR partially goes into the gap GA. The first electrode E1 and the second electrode E2 are structured such that voltage is applied thereto by an external power source (not illustrated) connected thereto via the first lead portion EL1 (FIG. 3) and the second lead portion EL2.

In the display device DSP of the first embodiment of FIG. 1, the first electrode E1 and the second electrode E2 are provided on a side of the substrate 1 of the cover member CB facing the display module MDL. However, the structures are not limited to this example. The first electrode E1 and the second electrode E2 need to be at least structured such that they are interposed between the cover member CB and the display module MDL, and such that an electric field can be applied to a part of the first portion. For example, the first electrode E1 and the second electrode E2 may be provided on the display surface of the display module MDL.

For example, the display device DSP may be manufactured as follows. First, uncured (or liquid) UV-curable resin containing polar monomers is applied to the display surface of the display panel PNL, in other words, to the surface of the second optical element OD2. Subsequently, the cover member CB is placed on the UV-curable resin layer. Then, the cover member CB is attached to the display module MDL by appropriate pressurization. Then, the attached structure is put into an oven. The UV-curable resin is heated, for example, for five minutes at 80° C. During the heating, the attached structure is allowed to stand until the UV-curable resin spreads out to cover the entire display area ACT. The UV-curable resin is interposed between the cover member CB and the display module MDL, and includes the first portion which is in contact with the light-shielding region CR and the second portion which is in contact with the phototransmissive region TR. Thus, the UV-curable resin covers the same area as the UV-cured resin layer PSR.

During the heating, voltage (for example, 200 V) is applied between the first electrode E1 and the second electrode E2 by an external power source (not illustrated). Thus, an electric field is applied to the part of the first portion of the UV-curable resin (in other words, the portion which has entered the gap GA). The polar monomer of the UV-curable resin becomes activated in their molecular motions by being heated and thus becomes capable of rotating motion. By applying the electric field, the polar monomers of the UV-curable resin can be oriented in a direction corresponding to the direction of the electric field. When the polar monomers are oriented by the application of the electric field, the polar monomers of the UV-curable resin spread to the first portion, in which ultraviolet light is blocked by the light-shielding region CR, have an ordered arrangement advantageous to polymerization.

During the heating, ultraviolet light is allowed to irradiate toward the front side of the cover member CB from a light source such as a halogen lamp. The second portion of the UV-curable resin located in the display area ACT is irradiated with ultraviolet light passed through the phototransmissive region TR. The ultraviolet light passed through the phototransmissive region TR affects the second portion of the UV-curable resin PSR and generates radicals. In the UV-curable resin layer, radical polymerization continuously and effectively occurs due to the above ordered arrangement advantageous to polymerization built up between adjacent polar monomers. Thus, the radicals generated in the second portion also affect the first portion in series from the boundary with the phototransmissive region TR. Thus, in addition to the second portion, the first portion is cured by radical polymerization.

In the above structure, the UV-curable resin of the first portion, which the ultraviolet light necessary for curing is hard to reach, can be surely cured. Even in a display device DSP having a narrow frame, or a display device DSP to which a display module MDL having a narrow peripheral area PRP is applied, it is possible to provide the UV-cured resin layer PSR over the entire display area ACT and prevent the UV-cured resin layer PSR from spreading to the outside of the peripheral area PRP.

In addition, it is possible to prevent occurrence of defects caused by undesired spreading of uncured UV-curable resin. For example, it is possible to prevent spread resin from going into a gap in the display panel PNL. Thus, it is possible to prevent degradation of quality caused by display defects. Moreover, it is possible to prevent UV-curable resin from spreading to the external side of the display module MDL. Thus, the degradation of quality can be prevented.

Since the process for removing excessively spread resin is unnecessary, generation of contaminants can be prevented, and the number of process steps can be reduced. In the present embodiment, it suffices that UV light is allowed to radiate toward the front side of the cover member CB. There is no need to add an additional step of irradiating the lateral side or rear side of the display module MDL with ultraviolet light to facilitate the curing of the resin. Thus, the manufacturing facilities can be simplified.

In the method for manufacturing the display device DSP of the first embodiment, uncured UV-curable resin containing polar monomers is applied to the display surface of the display panel PNL. However, the method is not limited to this example. For example, UV-curable resin may be applied to the surface of the cover member CB on which the colored layer 5 is formed.

Next, a display device according to a second embodiment is described. The display device of the second embodiment has the same structure as the display device DSP of the first embodiment except that a cover member CB' is provided as illustrated in FIG. 4 in place of the cover member CB of the first embodiment.

The cover member CB' of the second embodiment is different from the cover member CB of the first embodiment in that a second electrode E2' is provided only in an area corresponding to the peripheral area PRP in which a mounting portion MT of a display module MDL is provided. The other constructions are the same as those of the cover member CB of FIG. 3.

Figure 4:
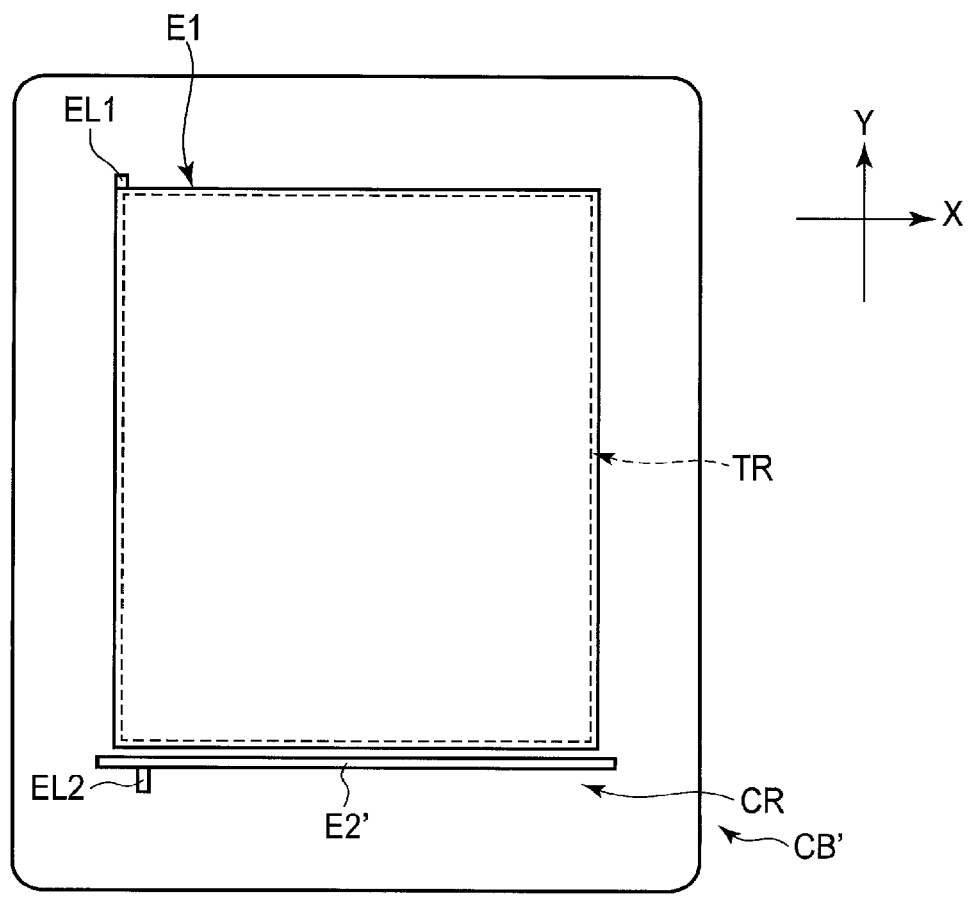
FIG. 4 is a plan view schematically illustrating a cover member provided in a display device according to a second embodiment.

In the display device comprising the cover member CB' of FIG. 4 in the second embodiment, the second electrode E2' is provided in an area corresponding to the peripheral area PRP, in which the mounting portion MT of the display module MDL is provided. This area is particularly difficult to be irradiated with ultraviolet light. Thus, the first electrode E1 and the second electrode E2' are capable of applying an electric field to a part of the first portion, which is particularly difficult to be irradiated with ultraviolet light. In this manner, it is possible to facilitate curing of the first portion, which is particularly difficult to be irradiated with ultraviolet light. Thus, uncured UV-curable resin can be prevented from remaining in the display device DSP. In the display device of the second embodiment, uncured resin can be surely cured by allowing UV light to radiate toward the lateral side or rear side of the display module MDL in addition to the front side of the cover member CB'.

FIG. 5 is an enlarged cross-sectional view schematically illustrating a display device DSP" according to a third embodiment.

The display device DSP" of the third embodiment has the same structure as the display devices of the first and second embodiments except that a cover member CB" comprises neither a first electrode E1 nor a second electrode E2. In the third embodiment, a UV-cured resin layer PSR' is formed by curing a UV-curable resin containing polar monomers which form intermediate-range order after the resin is heated to a temperature equal to or above the onset temperature of molecular motion. The onset temperature of molecular motion is the temperature as a threshold at which the polar monomers of the UV-curable resin start molecular motion restricted by interaction between molecules. Polar monomers which are heated to or above this temperature can actively perform molecular motion such as translation or rotation. The polar monomers after being heated to or above the onset temperature of molecular motion spontaneously transition to an arrangement having intermediate-range order, which is energetically stable and advantageous to polymerization, along with natural cooling or forced cooling. In the UV-curable resin, radical polymerization continuously and effectively occurs by the arrangement having intermediate-range order, which is advantageous to polymerization between adjacent polar monomers.

Intermediate-range order is the order of an intermediate range between long-range order, which is the order formed in a long range, for example, a crystalline structure, and short-range order, which is the order formed in a short range, for example, between several molecules. When the UV-cured resin layer has long-range order, it has optical anisotropy. Thus, it is necessary to form intermediate-range order, which has optical isotropy. Intermediate-range orderliness can be analyzed by analysis of an X-ray absorption fine structure (XAFS) or X-ray diffractometry using X-rays of high intensity.

The UV-curable resin is a resin material which is cured by irradiation with ultraviolet light (for example, light having a wavelength less than or equal to 380 nm). The UV-cured resin layer PSR' contains polar monomers having permanent dipoles as a monomer component. The polar monomers have functional groups such as a hydroxyl group, an amino group, a carboxy group and an amide group. The UV-cured resin layer PSR' may be formed of an acrylic resin which is transparent UV-curable resin, such as 2-ethylhexyl acrylate. The UV-cured resin layer PSR' used for the display device DSP" of the third embodiment has, for example, an onset temperature of molecular motion of 70° C.

The onset temperature of molecular motion is preferably greater than ambient temperature (25° C.) and less than 85° C. in terms of the heat resistance of the second polarizer PL2 of the display device DSP', etc.

For example, the display device DSP" is manufactured as follows. First, uncured (or liquid) UV-curable resin containing polar monomers which form intermediate-range order after the resin is heated to or above the onset temperature of molecular motion is applied to the display surface of the display panel PNL, in other words, to the surface of the second optical element OD2.

Subsequently, the cover member CB" is placed on the UV-curable resin layer. Then, the cover member CB" is attached to the display module MDL by appropriate pressurization. After that, the attached structure is placed into an oven. The UV-curable resin is heated to or above the onset temperature of molecular motion, for example, 80° C., for five minutes. During the heating, the attached structure is allowed to stand until the UV-curable resin spreads out to cover the entire display area ACT. The UV-curable resin is interposed between the cover member CB" and the display module MDL, and includes a first portion which is in contact with a light-shielding region CR and a second portion which is in contact with a phototransmissive region TR. The UV-curable resin covers the same area as the UV-cured resin layer PSR'.

The polar monomers which are heated to or above the onset temperature of molecular motion can actively perform molecular motion such as translation or rotation. The polar monomers after being heated to or above the onset temperature of molecular motion spontaneously transition to the arrangement having intermediate-range order, which is energetically stable and advantageous to polymerization, along with natural cooling or forced cooling. By transitioning to the arrangement having intermediate-range order, the polar monomers of the UV-curable resin spread to the first portion, in which ultraviolet light is blocked by the light-shielding region CR, have an ordered arrangement advantageous to polymerization.

During or after the heating, UV light allowed to radiate toward the front side of the cover member CB" from a light source such as a halogen lamp. The second portion of the UV-curable resin located in the display area ACT is irradiated with ultraviolet light which has passed through the phototransmissive region TR. The ultraviolet light which has passed through the phototransmissive region TR affects on the second portion of the UV-curable resin and generates radicals. In the UV-curable resin layer, radical polymerization continuously and effectively occurs by the arrangement having intermediate-range order, which is advantageous to polymerization between adjacent polar monomers. Thus, the radicals produced in the second portion also affect the first portion in series from the boundary with the phototransmissive region TR. Thus, in addition to the second portion, the first portion is cured by radical polymerization.

In the above structure, the UV-curable resin of the first portion, which the ultraviolet light necessary for curing is difficult to reach, can be surely cured in a manner similar to that of the display device DSP of the first embodiment.

In the method for manufacturing the display device DSP" of the third embodiment, the UV-curable resin is irradiated with ultraviolet light to be cured after heated to or above the onset temperature of molecular motion. However, the UV-curable resin is preferably irradiated with ultraviolet light after naturally cooling to normal temperature. The heated polar monomers spontaneously transition to the arrangement having intermediate-range order, which is energetically stable and advantageous to polymerization, along with cooling. When UV-curable resin is cured after being naturally cooled, the polar monomers can be more orderly arranged.

In the method for manufacturing the display device DSP" of the third embodiment, uncured UV-curable resin containing polar monomers is applied to the display surface of the display panel PNL. However, the method is not limited to this example. For example, UV-curable resin may be applied to the surface of the cover member CB" on which a colored layer 5 is formed.

The UV-curable resin which is used to form the UV-cured resin layer PSR' in the display device DSP' of the third embodiment and contains polar monomers forming intermediate-range order after it is heated to or above the onset temperature of molecular motion can be also used for the display devices of the first and second embodiments. In this case, when an electric field is applied to the UV-curable resin by the first and second electrodes E1 and E2, it is possible to provide polar monomers with orderliness at a temperature less than the onset temperature of molecular motion. Thus, even when the resin is heated to a temperature less than the onset temperature of molecular motion, it is possible to surely cure the UV-curable resin of the first portion, which the ultraviolet light necessary for curing is difficult to reach. The energy for starting molecular motion is mainly provided by heat. However, the energy may be provided by both heat and an electric field. When the resin is heated to a temperature less than the onset temperature of molecular motion, it is possible to compensate for the energy insufficient to start molecular motion with an electric field.

Figure 6:
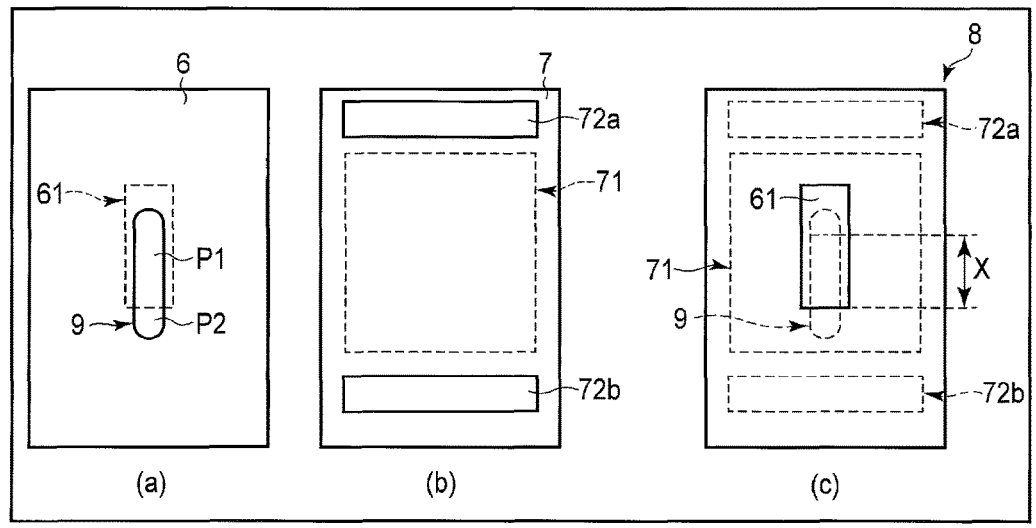
FIG. 6 is a schematic diagram explaining method for measuring the cured distance in the shaded portion of ultraviolet-curable resin, wherein (a) illustrates a first glass substrate, (b) illustrates a second glass substrate, and (c) illustrates an evaluation sample prepared by bonding the first glass substrate with the second glass substrate by double-sided tapes.

FIG. 6 is a schematic diagram illustrating a method for measuring the cured distance x (mm) in a shaded portion P1 of UV-curable resin 9, wherein (a) illustrates a first glass substrate 6, (b) illustrates a second glass substrate 7, and (c) illustrates an evaluation sample 8 prepared by bonding the first glass substrate with the second glass substrate by adhesive tapes 72a and 72b.

First, the first glass substrate 6 and the second glass substrate 7 are prepared. The first glass substrate 6 illustrated in (a) of FIG. 6 is formed by a rectangular transparent glass plate having a width of 60 mm and a length of 150 mm. A rectangular first light-shielding tape 61 having a width of 10 mm and a length of 50 mm is attached to the central portion of one surface of the first glass substrate 6. The second glass substrate 7 illustrated in (b) of FIG. 6 has the same rectangular shape as the first glass substrate 6. A rectangular second light-shielding tape 71 having a width of 50 mm and a length of 140 mm is attached to the central portion of one surface of the second glass substrate 7.

Subsequently, the UV-curable resin 9 is applied to an area on the first glass substrate 6 such that the area is on a side opposite to the first light-shielding tape 61. The UV-curable resin 9 is applied to the area so as to extend linearly in the longitudinal direction of the first light-shielding tape 61. The UV-curable resin 9 contains polar monomers which form intermediate-range order after the resin is heated to or above the onset temperature of molecular motion. The UV-curable resin 9, 169 g, is applied so as to have a length of 45 mm by using an application device.

Subsequently, the adhesive tapes 72a and 72b having a thickness of 110 μm are attached to the peripheral portion on the second glass substrate 7. Then, as illustrated in (c) of FIG. 6, the surface of the first glass substrate 6 to which the UV-curable resin 9 is applied is attached to the surface of the second glass substrate 7 to which the adhesive tapes 72a and 72b are attached. In this manner, the surfaces are attached to each other with the adhesive tapes 72a and 72b, and thus, the evaluation sample 8 is prepared.

The UV-curable resin 9 between the first glass substrate 6 and the second glass substrate 7 is spread in a predetermined gap corresponding to the thickness of the adhesive tapes 72a and 72b. When viewed from the first glass substrate 6 side, the UV-curable resin 9 has the shaded portion P1 which is shaded from light by the first light-shielding tape 61, and an unshaded portion P2 which is not shaded from light. Subsequently, a plurality of evaluation samples 8 are placed on a hot plate for three minutes and heated to respective temperatures between 40° C. and 90° C.

Subsequently, the unshaded portion P2 of the UV-curable resin 9 is irradiated with ultraviolet light at 4000 mJ/cm$^2$ from the first glass substrate 6 side of each evaluation sample 8.

Subsequently, the cured distance x(mm) from the boundary between the shaded portion P1 and the unshaded portion P2 in the shaded portion P1 of the UV-curable resin 9 is measured for each evaluation sample 8 having the corresponding temperature.

Figure 7:
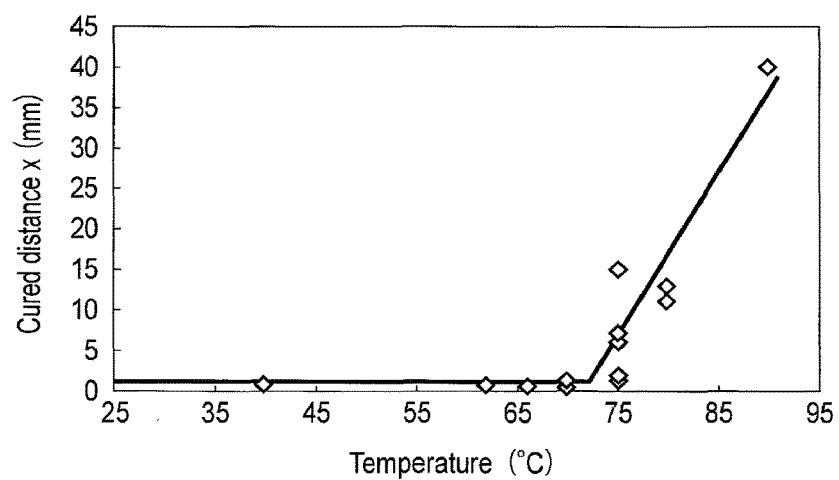
FIG. 7 is a graph illustrating the results of measurement by the method for measuring the cured distance in the shaded portion of ultraviolet-curable resin in FIG. 6.

FIG. 7 is a graph illustrating the results of measurement by the method for measuring the cured distance in the shaded portion of the UV-curable resin of FIG. 6. In FIG. 7, the horizontal axis represents the temperature (° C.), and the vertical axis represents the cured distance x(mm) in the shaded portion P1 of the UV-curable resin.

As illustrated in FIG. 7, when the temperature of the evaluation sample 8 is less than 70° C., the cured distance x (mm) in the shaded portion P1 of the UV-curable resin is 0.2 mm produced by ultraviolet light which enters the evaluation sample 8 obliquely with respect to the perpendicular direction of the evaluation sample 8.

When the temperature of the evaluation sample 8 is greater than or equal to 70° C., the shaded portion P1 of the UV-curable resin 9 is cured. The results show that the shaded portion 21 of the UV-curable resin 9 is cured with a threshold that the heat temperature of the evaluation sample 8 is 70° C. The temperature of the threshold is the onset temperature of molecular motion of the UV-curable resin 9. In this manner, the UV-curable resin 9 having the onset temperature of molecular motion has a property that the shaded portion P1 is cured in accordance with the heat temperature of the evaluation sample 8.

Further, this relationship is also maintained when the evaluation sample 8 is heated to or above the onset temperature of molecular motion, is naturally cooled to normal temperature and is irradiated with ultraviolet light. This result shows that the heat applied to the UV-curable resin does not directly contribute to radical polymerization to obtain the above relationship. In the polar monomers of the UV-curable resin, intermediate-range order is formed after the resin is heated to or above the onset temperature of molecular motion. Thus, it is possible to cure the shaded portion P1 continuously with the radical polymerization which has occurred in the unshaded portion P2, by irradiating the unshaded portion P2 of the UV-curable resin with ultraviolet light. In contrast, since in the conventional UV-curable resin, intermediate-range order is not formed after the resin is heated to the onset temperature of molecular motion in the conventional UV-curable resin, the shaded portion P1 is not cured.

As explained above, in the above embodiments, it is possible to provide a display device and a method for manufacturing such a display device, capable of curing the UV-curable resin in an area which the ultraviolet light necessary for curing is difficult to reach.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device comprising:
   a display module comprising:
      a display area which displays an image;

a peripheral area which has a frame shape and is located outside the display area; and
a mounting portion which is provided in the peripheral area and mounts a signal supply source thereon;
a cover member comprising:
a phototransmissive region facing the display area; and
a light-shielding region facing the peripheral area;
an ultraviolet-cured resin layer which bonds the display module with the cover member, includes a first portion and a second portion, and contains polar monomers as a monomer component, the first portion being in contact with a frame portion adjacent to the display area of the light-shielding region, the second portion being in contact with the phototransmissive region;
a transparent first electrode which is interposed between the cover member and the display module, and is provided so as to cover an entire part of the phototransmissive region; and
a second electrode which is interposed between the cover member and the display module, and is provided so as to be separated from the first electrode and extend along the first electrode in an area corresponding to the peripheral area in which the mounting portion of the display module is provided, the second electrode being provided such that a part of the first portion goes into a gap between the first electrode and the second electrode, wherein
the first and second electrodes apply an electric field to the part of the first portion to orient the polar monomers.

2. The display device of claim 1, wherein
the first and second electrodes are provided on a surface of the cover member on a side facing the display module.

3. The display device of claim 1, wherein
the second electrode is separated from the first electrode and has a frame shape surrounding the first electrode in the light-shielding region on a surface of the cover member on a side facing the display module.

4. The display device of claim 2, wherein
the second electrode is separated from the first electrode and has a frame shape surrounding the first electrode in the light-shielding region on the surface of the cover member on the side facing the display module.

5. The display device of claim 1, wherein
the phototransmissive region is rectangular,
the first electrode is rectangular, corresponding to a shape of the phototransmissive region, and
the second electrode is separated from the first electrode and has a rectangular frame shape surrounding the first electrode.

6. The display device of claim 2, wherein
the phototransmissive region is rectangular,
the first electrode is rectangular, corresponding to a shape of the phototransmissive region, and
the second electrode is separated from the first electrode and has a rectangular frame shape surrounding the first electrode.

7. The display device of claim 3, wherein
the phototransmissive region is rectangular,
the first electrode is rectangular, corresponding to a shape of the phototransmissive region, and
the second electrode is separated from the first electrode and has a rectangular frame shape surrounding the first electrode.

8. The display device of claim 4, wherein
the phototransmissive region is rectangular,
the first electrode is rectangular, corresponding to a shape of the phototransmissive region, and
the second electrode is separated from the first electrode and has a rectangular frame shape surrounding the first electrode.

9. The display device of claim 1, wherein
the ultraviolet-cured resin layer comprises an acrylic resin.

10. The display device of claim 2, wherein
the ultraviolet-cured resin layer comprises an acrylic resin.

11. The display device of claim 3, wherein
the ultraviolet-cured resin layer comprises an acrylic resin.

12. The display device of claim 5, wherein
the ultraviolet-cured resin layer comprises an acrylic resin.

13. A display device comprising:
a display panel comprising:
a display area which displays an image; and
a peripheral area which has a frame shape and is located outside the display area;
a cover member comprising:
a phototransmissive region facing the display area; and
a light-shielding region facing the peripheral area;
a ultraviolet-cured resin layer which bonds the display panel with the cover member and contains polar monomers as a monomer component;
a transparent first electrode which is provided between the cover member and the display panel so as to cover an entire part of the phototransmissive region; and
a second electrode provided between the cover member and the display panel, the second electrode being separated from the first electrode and extending along the first electrode in the peripheral area of the display panel, wherein
the ultraviolet-cured resin layer is provided in a gap between the first electrode and the second electrode, and
the polar monomers are oriented in a direction of an electric field formed between the first electrode and the second electrode.

14. The display device of claim 13, wherein
the first electrode and the second electrode are provided on a surface of the cover member on a side facing the display panel.

15. The display device of claim 13, wherein
the second electrode is separated from the first electrode and has a frame shape surrounding the first electrode in the light-shielding area on a surface of the cover member on a side facing the display panel.

16. The display device of claim 14, wherein
the second electrode is separated from the first electrode and has a frame shape surrounding the first electrode in the light-shielding area on the surface of the cover member on the side facing the display panel.

17. The display device of claim 13, wherein
the phototransmissive region is rectangular,
the first electrode is rectangular, corresponding to a shape of the phototransmissive region, and
the second electrode is separated from the first electrode and has a rectangular frame shape surrounding the first electrode.

18. The display device of claim 13, wherein
the ultraviolet-cured resin layer includes acrylic resin.

* * * * *